H. A. LOSER.
APPARATUS AND PROCESS FOR MOLDING CONCRETE FORMS.
APPLICATION FILED MAR. 10, 1909.

937,620.

Patented Oct. 19, 1909.

3 SHEETS—SHEET 1.

Witnesses:
Frank J. Blanchard
J. S. Abbott

Inventor:
Harry A. Loser.
By Burton & Burton
Attorneys.

H. A. LOSER.
APPARATUS AND PROCESS FOR MOLDING CONCRETE FORMS.
APPLICATION FILED MAR. 10, 1909.
937,620.
Patented Oct. 19, 1909.
3 SHEETS—SHEET 2.
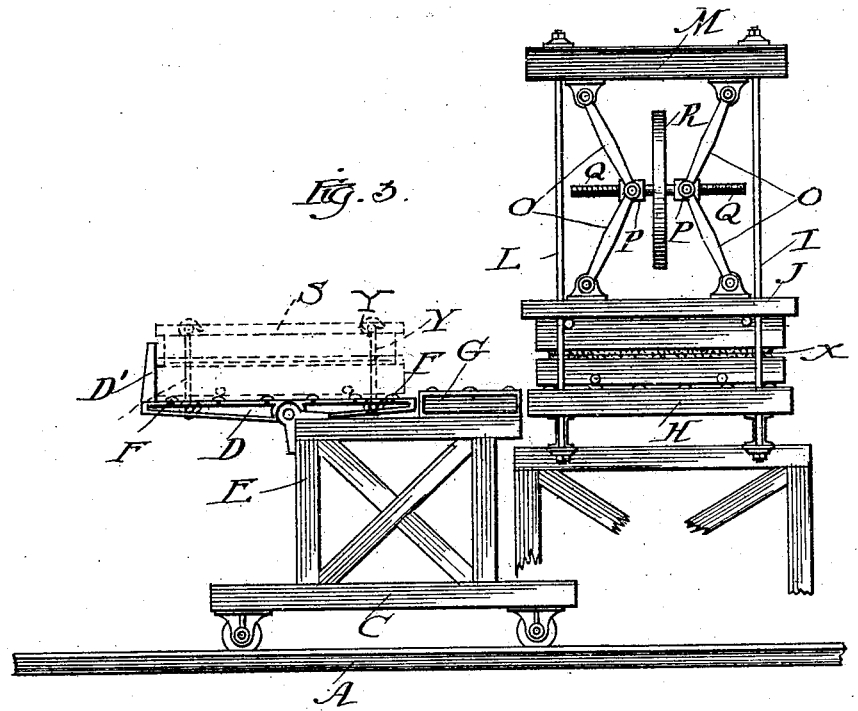
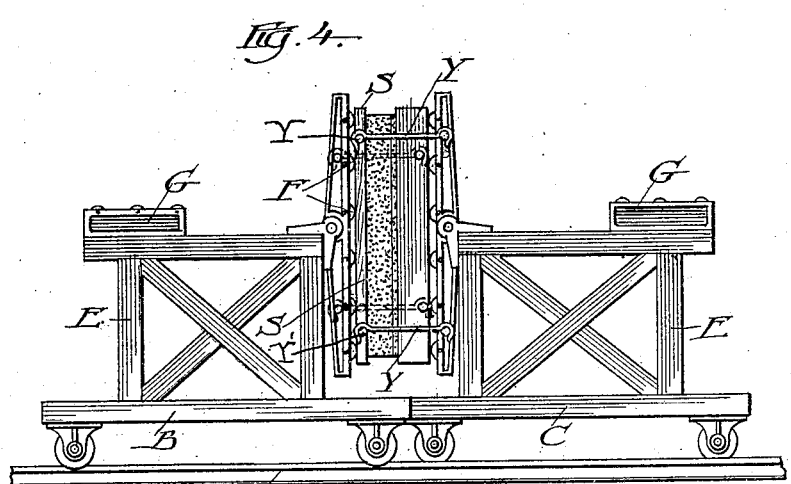

H. A. LOSER.
APPARATUS AND PROCESS FOR MOLDING CONCRETE FORMS.
APPLICATION FILED MAR. 10, 1909.
937,620.
Patented Oct. 19, 1909.
3 SHEETS—SHEET 3.
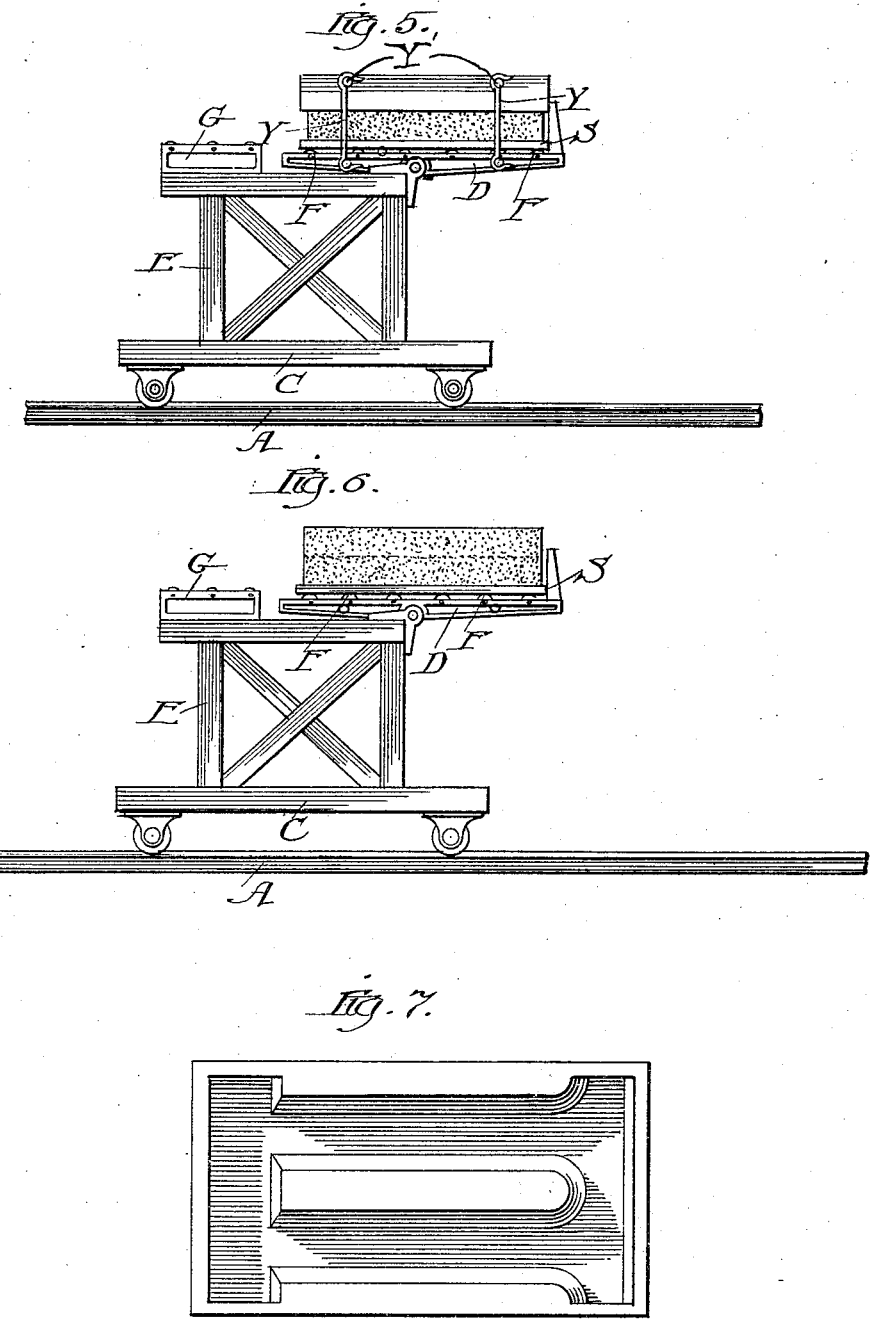

UNITED STATES PATENT OFFICE.

HARRY A. LOSER, OF WEST LAFAYETTE, INDIANA.

APPARATUS AND PROCESS FOR MOLDING CONCRETE FORMS.

937,620.   Specification of Letters Patent.   Patented Oct. 19, 1909.

Application filed March 10, 1909. Serial No. 482,520.

*To all whom it may concern:*

Be it known that I, HARRY A. LOSER, a citizen of the United States, residing at West Lafayette, in the county of Tippecanoe and State of Indiana, have invented new and useful Improvements in Apparatus and Processes for Molding Concrete Forms, reference being had to the drawings forming a part thereof.

The purpose of this invention is to provide an improved apparatus for molding concrete forms adapted to produce such forms in two or more sections and assemble and compact them into a unitary structure immediately upon molding, so that they may set as integral.

It consists in the features of construction and their combinations shown and described as indicated in the claims.

Figure 1:
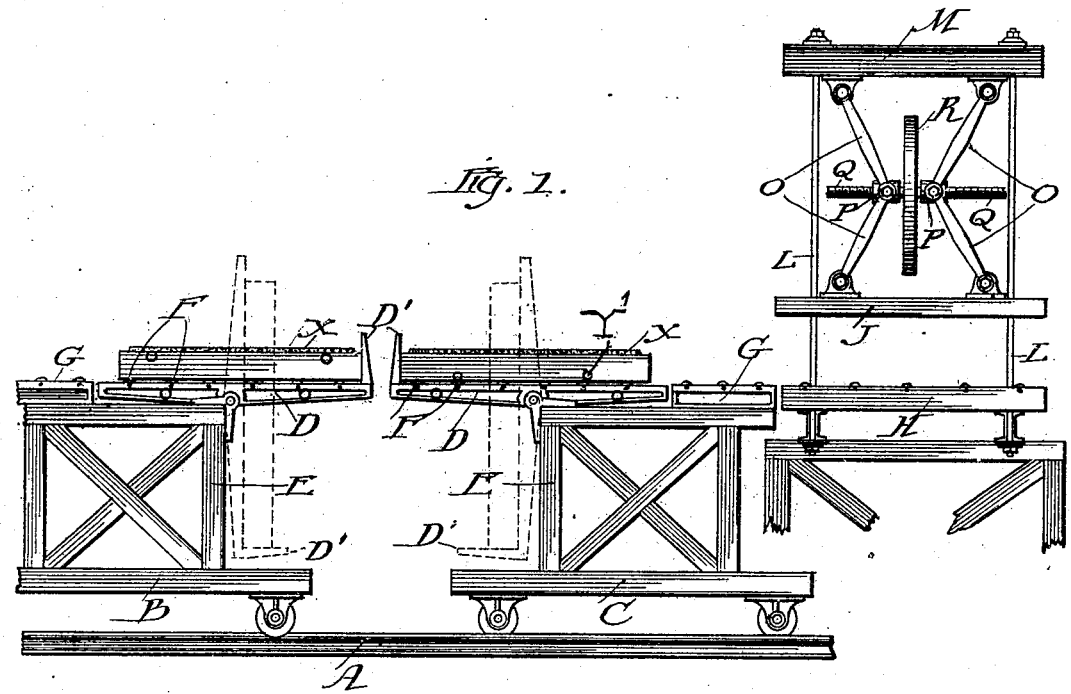
Figure 2:
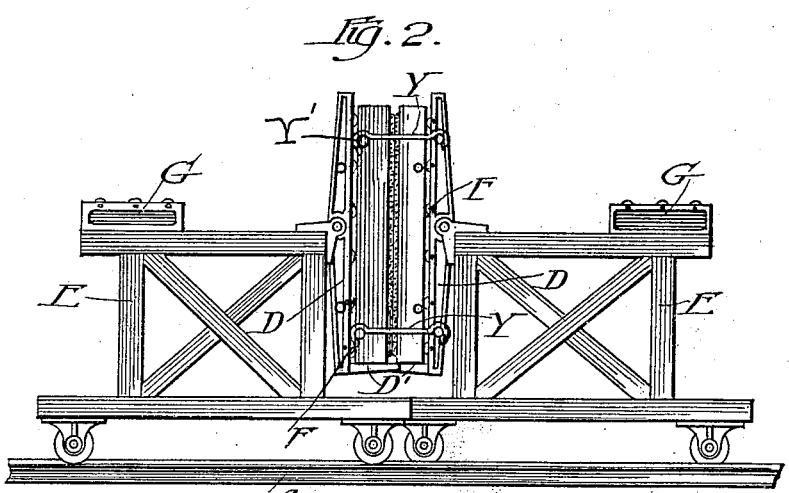

In the drawings:—Figure 1 is a side elevation of an apparatus embodying this invention, the parts being shown in the position in which the separate elements are separately molded. Fig. 2 is a side elevation of the same with the parts in position for assembling the two separately molded elements. Fig. 3 is a side elevation showing the elements assembled and being compressed for uniting them. Fig. 4 is a side elevation showing the two mold-carrying members and the molded form between them after substitution of the platen for one of the molds. Fig. 5 is a side elevation showing the molded form inverted upon the platen with the other mold removed. Fig. 6 is a side elevation of the same matter which is shown in Fig. 5 with the upper mold member removed exposing the molded body on the supporting platen. Figs. 7 and 8 are plan views of the upper and lower mold members respectively of a form adapted for molding concrete fence members.

The structure shown in the drawings embodying this invention comprises a track, A, upon which are mounted two carriages, B and C. Upon each of these carriages, there is mounted a mold-carrier, D, said mold carriers being fulcrumed upon the proximate upper corners of the frame superstructure, E, with which the trucks are each provided. Each of these mold carriers is provided with a series of transversely extending rollers, F, on which the molds respectively are lodged, and at their proximate ends each mold carrier has upstanding guard arms, $D^1$, to stop the molds and carry their weight when they are returned to vertical position, as hereinafter explained. The two mold members being formed for shaping respectively the two elements of the form to be molded, are filled and properly tamped while in the position shown in Fig. 1, a slight excess of material being left at the top projecting, as shown at $x$, above the upper margin of the mold. When both molds are filled and tamped the mold carriers are rocked to vertical position shown in dotted line in Fig. 1, bringing what were the upper faces of the two elements in position facing each other. The two carriages are now advanced toward each other until said faces are in contact, moderate pressure being applied by any convenient means to insure complete contact, and the two mold members are then locked together and both secured to the mold carrier on the right-hand carriage, hooks, Y, being provided for that purpose. The left-hand carriage being now withdrawn the complete mold comprising both members together with the molded form of both its elements tamped in proper relation is now held solely upon the mold carrier on the right-hand truck. This carrier being now rocked back to horizontal position, the entire mold comprising both members is moved to the right, running off the carrier, first onto the roller supports, G, which are provided upon the right-hand portion of the superstructure, E, of said right-hand carriage, and thence on over said roller supports off the same onto the press bed, H, where also suitable rollers, are provided to facilitate such movement. The entire mold is now in position between the bed and upper head, J, of the press. The press may be of any sufficiently powerful construction, that shown in the drawings being suitable, comprising, in addition to the vertical strain rods, L, the upper beam structure, M, toggle levers, O, O, connected to and by the interiorly threaded travelers, P, on the screw shaft, Q, having right and left threads at its opposite end portions respectively at opposite sides of the operating hand wheel, R. The operation of the press will be understood from this description. By means of the press the two elements of the molded form contained in the mold members respectively are compressed to the extent of the excess material, $x$, left protruding above the upper margins of the two mold members respectively as above described, and in such compression are thoroughly unified or rendered integral at their meeting faces. The press being opened, the upper mold member, is removed, being constructed for removal in any familiar manner dictated in detail by the particular form of the molded body. In the drawings, for simplicity of illustration the form of the mold is such as would be suitable for molding very simple outlines, from which one-piece mold members will relieve, and said mold members are therefore represented as not composed of separable parts. A platen, S, is now substituted for the remote upper mold member, and the molded form carried in the lower mold member and covered by the platen is moved back off the press bed onto the mold carrier on the right-hand truck. The mold carriers on both carriages being now swung to vertical position are advanced toward each other until the platen rests against the left-hand mold carrier, and the hooks, Y, on the left-hand mold carrier are engaged with the coöperating studs, $Y^1$, on the right-hand mold, thereby locking said mold with the molded form included between it and the platen on said left-hand carrier. The hooks, Y, of the right-hand carrier are now disengaged, and the trucks being separated the mold form is left carried on the carrier of the left-hand truck; and said carrier being now swung to horizontal position the remaining mold member may be removed, leaving the form resting upon the platen on the carrier of the left-hand truck ready to be carried away on said platen for curing.

I claim:—

1. In combination with a plurality of mold carriages, mold carriers thereon and movable molds on the carriers respectively, such carriers being mounted on the irrespective carriages for tilting to carry the molds into upright position facing each other; connections between the carriages for guiding their advance toward each other, and means for connecting the mold members together and to one of the tilting carriages.

2. In combination with a plurality of mold carriages, mold carriers thereon and movable molds on the carriers respectively, the carriers being fulcrumed on proximate upper corners of their respective carriages for tilting to upright position at the proximate ends of the carriages; guides along which the carriages are advanced toward each other to bring the upright molds together, and means for locking both mold members to one of the carriages when they are thus together.

3. In combination with a plurality of mold carriages, mold carriers thereon and movable molds on the carriers respectively, the carriers being fulcrumed on upper proximate corners of their respective carriages and adapted to be rocked over such corners to carry the molds into upright position facing each other; a truck on which the two carriages are mounted for travel toward each other, and means for locking the assembled mold members to one carrier.

4. In combination with a plurality of mold carriages, mold carriers thereon and movable molds on the carriers respectively, such carriers being mounted on their respective carriages for tilting to carry the molds into upright position facing each other; guides along which the carriages are advanced toward each other to bring the mold members together; means for applying pressure to the mold members for forcing them together, and means for locking the assembled mold members alternately to either carrier.

5. In combination with a plurality of mold carriages, mold carriers thereon; movable molds on the carriers respectively; a track upon which the carriers are mounted for traveling toward and from each other; a press adjacent to one of the carriages, the carriers being fulcrumed on upper proximate corners of their respective carriages for locking the molds to upright position facing each other, and means for connecting the mold on either carrier to the opposite carrier, the press bed and the adjacent carriage having mold supports at the same level for running the mold from the carrier to the press and back.

6. The process of molding concrete forms which consists in forming and compacting separate elements of such forms in horizontal position in separate mold members; swinging such mold members to vertical position and advancing them to bring the elements exposed at their open faces into contact, exposing the mold members to pressure for forcing them together; positioning the entire form horizontally; withdrawing the upper mold member and substituting a platen; swinging the entire form to a vertical position and advancing it, platen foremost, to a vertically positioned carrier; securing the remaining mold member to such carrier; swinging the entire form to horizontal position with the carrier, and removing the remaining mold member.

7. The process of molding concrete forms which consists in molding and compacting separate elements of such form in separate horizontally positioned mold members; supplying surplus concrete at the upper open faces of such mold members; swinging both mold members to vertical position and advancing them toward each other to bring their respective elements into contact at said faces; exposing the two mold members to pressure for compressing the excess of material together and into the form, removing one mold member and substituting a platen, then reversing the form and removing the other mold member.

In testimony whereof, I have hereunto set my hand at La Fayette, Indiana, this 2 day of March, 1909.

HARRY A. LOSER.

Witnesses:
JOHN D. CRAMER,
H. M. LONG.